US012534105B1

(12) United States Patent
Zlotnik et al.

(10) Patent No.: US 12,534,105 B1
(45) Date of Patent: Jan. 27, 2026

(54) TREE SEARCH INTEGRATED DYNAMIC VEHICLE CONTROLLER PROFILE FOR VEHICLE PATH PLANNING

(71) Applicant: Zoox, Inc., Foster City, CA (US)

(72) Inventors: David Evan Zlotnik, Menlo Park, CA (US); Vincent Andreas Laurense, Foster City, CA (US); Olivier Amaury Toupet, Escondido, CA (US); Joseph Funke, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 250 days.

(21) Appl. No.: 18/217,138

(22) Filed: Jun. 30, 2023

(51) Int. Cl.
*B60W 60/00* (2020.01)
*B60W 30/14* (2006.01)
*B60W 50/00* (2006.01)

(52) U.S. Cl.
CPC ........ *B60W 60/001* (2020.02); *B60W 30/146* (2013.01); *B60W 50/0098* (2013.01); *B60W 2050/0019* (2013.01); *B60W 2530/00* (2013.01); *B60W 2554/00* (2020.02)

(58) Field of Classification Search
CPC ............. B60W 60/001; B60W 30/146; B60W 50/0098; B60W 2050/0019; B60W 2530/00; B60W 2554/00
See application file for complete search history.

(56) References Cited

U.S. PATENT DOCUMENTS

| | | | |
|---|---|---|---|
| 9,857,795 B2* | 1/2018 | Gupta | B60W 30/20 |
| 10,649,459 B2 | 5/2020 | Wang | |
| 10,809,719 B2* | 10/2020 | Binet | G05D 1/0088 |
| 10,953,883 B2* | 3/2021 | Sakaguchi | B60W 30/18163 |
| 11,231,481 B1 | 1/2022 | Cohen | |
| 11,541,909 B1* | 1/2023 | Poubel Orenstein | B60W 60/0013 |
| 2015/0345967 A1* | 12/2015 | Meuleau | G01C 21/3453 701/25 |
| 2017/0277194 A1* | 9/2017 | Frazzoli | B60W 60/0016 |
| 2017/0277195 A1* | 9/2017 | Frazzoli | B60W 60/00276 |
| 2018/0196436 A1* | 7/2018 | Gupta | G05D 1/0212 |
| 2019/0071078 A1* | 3/2019 | Kallmeyer | B60W 30/10 |
| 2019/0079523 A1* | 3/2019 | Zhu | G05D 1/0274 |
| 2019/0220030 A1* | 7/2019 | Ohmura | B60W 30/0953 |

(Continued)

FOREIGN PATENT DOCUMENTS

| | | | | |
|---|---|---|---|---|
| CA | 3068955 A1 * | 1/2019 | | B60W 30/00 |
| CN | 110023165 A * | 7/2019 | | B60W 30/09 |

(Continued)

OTHER PUBLICATIONS

DE-102016218121-A1 translation (Year: 2018).*

(Continued)

*Primary Examiner* — Kyle T Johnson
(74) *Attorney, Agent, or Firm* — Lee & Hayes, P.C.

(57) ABSTRACT

A tree search may comprise a cost function that may be used to determine, from multiple controller profiles, a controller profile to implement a transition between vehicle actions. A controller profile may limit the controls output by a controller sufficient to track from a first vehicle action to a second vehicle action. The controller controls may result in a trajectory achieved by the vehicle and the controller profile may limit the controls of the controller such that the trajectory is limited by a maximum jerk and/or maximum acceleration.

20 Claims, 5 Drawing Sheets

(56) References Cited

U.S. PATENT DOCUMENTS

| | | | | |
|---|---|---|---|---|
| 2019/0291726 A1* | 9/2019 | Shalev-Shwartz | .... | B60W 30/09 |
| 2020/0363806 A1* | 11/2020 | Kobilarov | .............. | G06V 20/56 |
| 2021/0046924 A1* | 2/2021 | Caldwell | .............. | B60W 30/09 |
| 2021/0129834 A1* | 5/2021 | Gier | .................. | B60W 30/0956 |
| 2021/0133466 A1* | 5/2021 | Gier | .................... | G05D 1/0223 |
| 2021/0197798 A1* | 7/2021 | Funke | ................ | B62D 15/0285 |
| 2021/0339772 A1* | 11/2021 | Ramamoorthy | ...... | B60W 40/04 |
| 2022/0176881 A1* | 6/2022 | Hao | ........................ | B60K 35/22 |
| 2023/0041975 A1 | 2/2023 | Caldwell | | |
| 2023/0069732 A1* | 3/2023 | Aggoune | .............. | B60W 50/14 |
| 2023/0415772 A1* | 12/2023 | Wolff | ..................... | G06V 20/54 |
| 2024/0326862 A1* | 10/2024 | Ito | ....................... | B60W 60/001 |
| 2025/0065890 A1* | 2/2025 | Theisinger | ........ | B60W 50/0098 |

FOREIGN PATENT DOCUMENTS

| | | | | |
|---|---|---|---|---|
| DE | 102016218121 A1 * | 3/2018 | | |
| DE | 102017208383 A1 * | 11/2018 | ............. | G08G 1/147 |
| DE | 102023206807 B3 * | 10/2024 | ............ | B60W 40/02 |

OTHER PUBLICATIONS

CN-110023165-A translation (Year: 2019).*
DE-102023206807-B3 translation (Year: 2024).*
DE-102017208383-A1 translation (Year: 2018).*
U.S. Appl. No. 17/184,559, filed Feb. 24, 2021.

* cited by examiner

TREE SEARCH INTEGRATED DYNAMIC VEHICLE CONTROLLER PROFILE FOR VEHICLE PATH PLANNING

BACKGROUND

An autonomous vehicle may have difficulty navigating accurately and/or efficiently when normative operating conditions are altered, such as when roadway indicators are obscured (e.g., by snow, garbage, sand), degraded (e.g., burned out light, worn out lane markings), and/or invalidated (e.g., an obstruction partially blocks a lane, traffic signage and/or traffic cones indicate an alternate lane that conflicts with original lane markings). Moreover, various environmental factors and human and animal behavior may be erratic or unpredictable, which may further make autonomous vehicle navigation difficult. Furthermore, even if an autonomous vehicle chooses a correct action to take, it may do so in a jerky manner that feels unnatural to a passenger and/or that may appear unnatural to other drivers or pedestrians.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
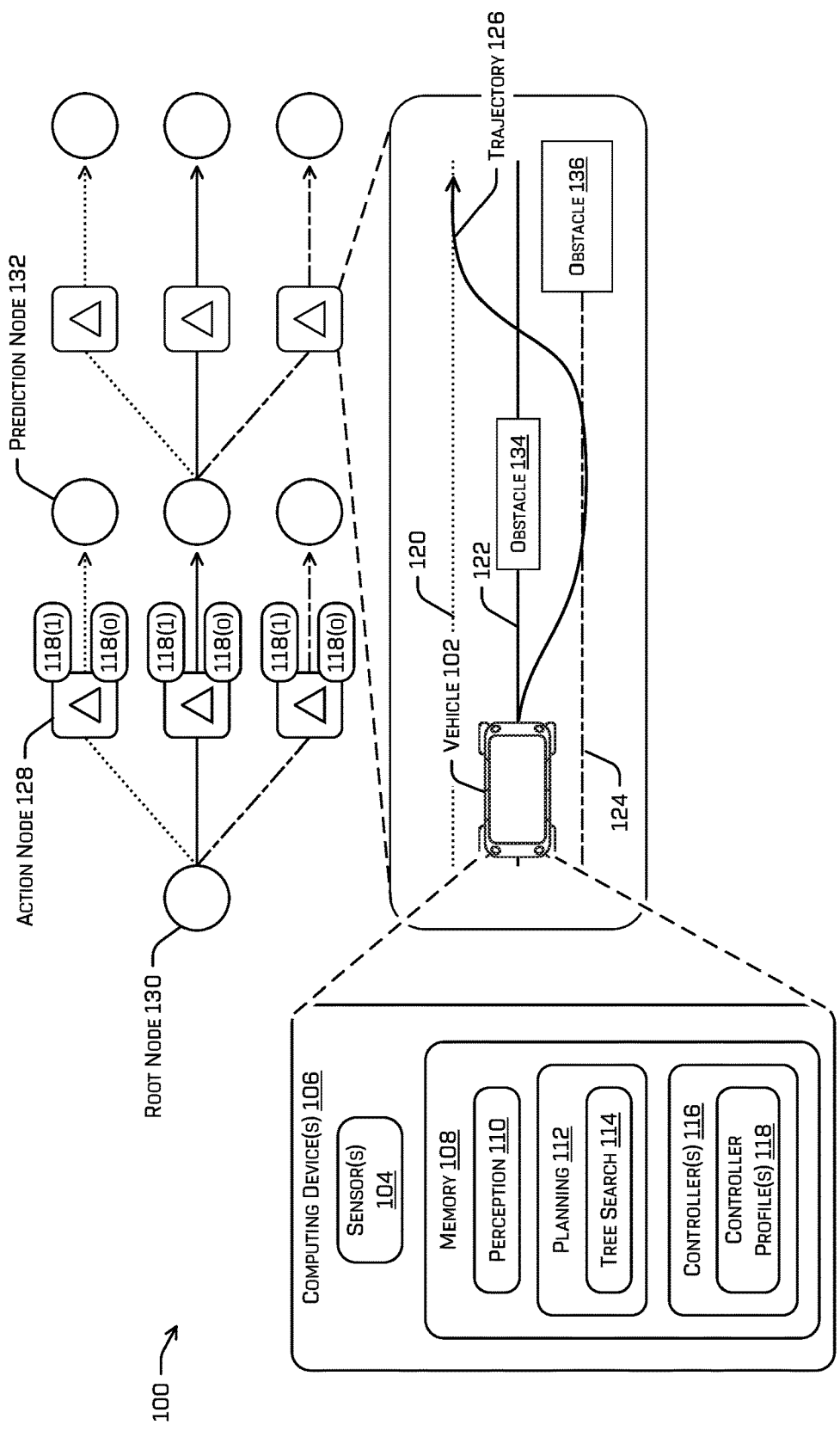
FIG. 1 illustrates an autonomous vehicle and an example scenario in which the autonomous vehicle determines to transition between different candidate actions as part of a tree search. A controller profile may determine properties of the trajectory for tracking by a controller to accomplish such a transition.

Even when an autonomous vehicle determines a safe path to follow, a controller of the vehicle that determines controls for actuating drive components of the vehicle to navigate according to the path may do so in a manner that may be perceived by passengers or observers as being jerky or otherwise unnatural. The techniques (e.g., hardware, software, machines, and/or processes) discussed herein introduce dynamic controller profiles that modify parameters of a controller to increase the smoothness of the ride that results from the controller's tracking a path generated by a planning component of the vehicle. The techniques can also dynamically determine whether a smooth movement or a more assertive movement may be necessary, such as for safety or to squeeze by an object in tight quarters. In some examples, a controller profile may specify one or more properties of the controller and how rapidly it seeks to track an action determined by the planner. For example, the properties of the controller that may be dynamically adjusted may include a maximum acceleration, maximum jerk, and/or a gain associated with controls generated by the controller for actuating drive components. This may practically result in the controls generated by the controller being capped in how quickly the controller drives the drive components of the vehicle to achieve a change in the vehicle's position, velocity, acceleration, turning rate, and/or the like. For example, the vehicle may generate controls to transition from a first action to a second action. The maximum acceleration, maximum jerk, and/or gains may determine how quickly the controller will achieve the second action. In some examples, adjusting a gain of the controller may result in a very high jerk or acceleration, regardless of the speed of the vehicle or how low the gain is set. Accordingly, a controller profile may include at least a maximum acceleration and/or maximum jerk. Tracking an action by the controller, according to the control profile determined, may include determining actuation controls for drive components to achieve a specific action determined by the planning component of the vehicle.

In some examples, the techniques discussed herein may include an autonomous vehicle guidance system that generates a path for controlling an autonomous vehicle based at least in part on a tree search technique that determines a candidate action and predicts a future state of the environment associated with the autonomous vehicle responsive to the candidate action. The tree search may determine an action for the vehicle to carry out based at least in part on determining costs associated with different candidate actions and selecting one of the candidate actions based on a cost associated therewith from among the multiple candidate actions and their respective costs. The cost may be based at least in part on a likelihood of object impact, safety, vehicle progress along a route, passenger comfort, drive dynamics, and/or the like. For example, a safety objective may be associated with multiple different sub-costs that may be based at least in part on the proximity to an object that a candidate action would bring the vehicle, minimum braking distance or maximum braking force to a nearest object, conformance to rules of the road, and/or the like. A passenger comfort objective may be associated with determining an acceleration or jerk associated with the candidate action and/or one or more lateral and/or longitudinal velocity, acceleration, and/or jerk thresholds.

Additionally or alternatively, the cost determined by the tree search in association with a candidate action may be based on a controller profile. In some examples, a different cost may be determined for up to each different controller profile for a same candidate action. The way the different controller profiles cause the candidate action to be carried out may result in changes to the other costs. For example:

- a nominal controller profile may result in the vehicle executing a first trajectory to accomplish a candidate action that brings the vehicle within a first closest distance to an object and results in a first maximum jerk and/or acceleration in executing the first trajectory;
- an aggressive controller profile may result in the vehicle executing a second trajectory to accomplish the same candidate action, but that brings the vehicle within a second closest distance to an object and results in a second maximum jerk and/or acceleration in executing the second trajectory that may be higher than the first maximum jerk and/or acceleration; and/or
- a comfort priority controller profile may result in the vehicle executing a third trajectory to accomplish the same candidate action, but that brings the vehicle within a third closest distance to an object and results in a third maximum jerk and/or acceleration in executing the third trajectory that may be lower than the first maximum jerk and/or acceleration.

Although this example discusses three controller profiles and gives them particular names, it is understood that the vehicle may use more or less controller profiles. Moreover, the trajectories that result from using these different controller profiles may each result in a same or different cost computed by the tree search. For example, each of the different trajectories in the example above for a single candidate action may be individually scored using cost functions associated with different target priorities for operating the vehicle, such as safety, comfort, progress, etc.

In some examples, a property of a controller profile may be dynamically determined based at least in part on scenario data determined based at least in part on sensor data. For example, the scenario data may include a velocity of the vehicle, a velocity of a candidate action, roadway geometry, a number or type of objects in the environment, an erratic behavior indication associated with an object, environmental condition (e.g., weather state, emergency existence), and/or a lateral displacement of a candidate action from a current position of the vehicle or a last candidate action implemented by the vehicle, etc. For example, in foggy weather conditions, a sub-cost determined by a cost function associated with vehicle progress along a route may be down-weighted in foggy weather or upscaled when an emergency condition has been detected, such as an earthquake, etc. In the latter example, a comfort cost function may be far down-weighted. Or in another example, detection of an environment type, such as operating on a highway, in an urban area, or in a residential area may cause a re-weighting of one or more of the cost functions.

The candidate action may be associated with a corresponding action node in the tree search and/or a prediction node. The prediction node may indicate a predicted state of the vehicle and/or the environment that would result from the vehicle carrying out the candidate action. In some examples, the prediction node may be based at least in part on sensor data and/or a previous prediction node if the prediction node is in a layer of prediction nodes beyond a first layer of prediction nodes. The cost may be based at least in part on the candidate action itself and/or the state indicated by a predicted state of the environment associated with the prediction node. The action node may indicate a first candidate action and a first controller profile. Another action node may indicate that same first candidate action and a second controller profile. Yet another action node may indicate a second candidate action and the third controller profile and so on.

The techniques discussed herein may improve the smoothness and natural feeling of the operation of a vehicle that is semi or fully autonomous. This may prevent passenger discomfort or even injury in some cases. Moreover, the techniques achieve these improvements to comfort and human-appearing movement of the vehicle without compromising safety by still allowing the vehicle to make sharp or abrupt maneuvers when necessary (e.g., to prevent impact with an object). Accordingly, the techniques may be an improvement over techniques that adjust gain of a controller alone. The vehicle may balance safety and comfort better and retain core safety by incorporating diverse controller profiles in the tree search, so that both abrupt and nominal maneuvers are possible, or abrupt, nominal, and ultra-smooth maneuvers are possible.

Example Scenario

FIG. 1 illustrates an example scenario 100 including a vehicle 102. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, aircraft, and/or the like.

According to the techniques discussed herein, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), odometry data (which may be determined based at least in part on inertial measurements and/or an odometer of the vehicle 102), a depth position sensor (e.g., a lidar sensor, a radar sensor, a sonar sensor, a time of flight (ToF) camera, a depth camera, an ultrasonic and/or sonar sensor), an image sensor (e.g., a visual light camera, infrared camera), an audio sensor (e.g., a microphone), and/or environmental sensor (e.g., a barometer, a hygrometer, etc.).

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the vehicle 102 and data capture, processing, commands, and/or controls may be communicated to/from the vehicle 102 by one or more remote computing devices via wired and/or wireless networks.

Computing device(s) 106 may comprise a memory 108 storing a perception component 110, a planning component 112, tree search component 114, controller(s) 116, and/or controller profile(s) 118. In some examples, the planning component 112 may comprise the tree search component 114. The perception component 110 may include a simultaneous localization and mapping (SLAM) component.

In general, the perception component 110 may determine what is in the environment surrounding the vehicle 102 and the planning component 112 may determine how to operate the vehicle 102 according to information received from the perception component 110. In some examples, the perception component 110 may comprise a pipeline of hardware and/or software, which may include one or more processing units (e.g., CPU(s), GPU(s), TPU(s), ASIC(s), FPGA(s), and/or the like), ML model(s), Kalman filter(s), and/or the like. In some examples, the perception component 110 may receive sensor data from the sensor(s) 104 and determine data related to objects in the vicinity of the vehicle 102 (e.g., classifications associated with detected objects, instance segmentation(s), semantic segmentation(s), mask(s), two and/or three-dimensional bounding boxes or other region(s) of interest, tracks), route data that specifies a destination of the vehicle, global map data that identifies characteristics of roadways (e.g., features detectable in different sensor modalities useful for localizing the autonomous vehicle), a pose of the vehicle (e.g. position and/or orientation in the environment, which may be determined by or in coordination with a localization component), local map data that identifies characteristics detected in proximity to the vehicle (e.g., locations and/or dimensions of buildings, trees, fences, fire hydrants, stop signs, and any other feature detectable in various sensor modalities), etc.

In particular, the perception component 110 may determine, based at least in part on sensor data, an object detection indicating an association of a portion of sensor data with an object in the environment. The object detection may indicate an object classification, sensor data segmentation (e.g., mask, instance segmentation, semantic segmentation), a region of interest (ROI) identifying a portion of sensor data associated with the object, object classification, and/or a confidence score indicating a likelihood (e.g., posterior probability) that the object classification, ROI, and/or sensor data segmentation is correct/accurate (there may be confidence score generated for each in some examples). For example, the ROI may include a portion of an image, lidar, and/or radar data identified by an ML model or ML pipeline of the perception component 110 as being associated with the object, such as using a bounding box, mask, an instance segmentation, and/or a semantic segmentation. The object classifications determined by the perception component 110 may distinguish between different object types such as, for example, a passenger vehicle, a pedestrian, a bicyclist, a delivery truck, a semi-truck, traffic signage, and/or the like. In some examples, object detections may be tracked over time. For example, a track may associate two object detections generated at two different times as being associated with a same object and may comprise a historical, current, and/or predicted object position, orientation, velocity, acceleration, and/or other state (e.g., door state, turning state, intent state such as signaling turn) of that object. The predicted portion of a track may be determined by a prediction component, in some examples.

In some examples, the perception component 110 may additionally or alternatively determine a likelihood that a portion of the environment is occluded to one or more sensors and/or which particular sensor types of the vehicle. For example, a region may be occluded to a camera but not to radar or, in fog, a region may be occluded to the lidar sensors but not to cameras or radar to the same extent.

The data produced by the perception component 110 may be collectively referred to as perception data. Once the perception component 110 has generated perception data, the perception component 110 may provide the perception data to a prediction component (unillustrated in FIG. 1 but illustrated in FIG. 2) and/or the planning component 112. The perception data may additionally or alternatively be stored in association with the sensor data as log data. This log data may be transmitted to a remote computing device (unillustrated in FIG. 1 for clarity) for use as at least part of training and/or validation data.

For example, the planning component 112 may determine trajectory 126 based at least in part on the perception data and/or other information such as, for example, one or more maps, localization information (e.g., where the vehicle 102 is in the environment relative to a map and/or features detected by the perception component 110), and/or a path generated by the tree search component 114. The path determined by the tree search component may indicate one or more candidate actions for the controllers to track. A candidate action may comprise a target heading, target steering angle, target steering rate, target position, target orientation, target velocity, target acceleration, and/or target curvilinear series of positions for the controller(s) to track as part of the path.

The tree search may determine a series of a candidate actions (and controller profiles) to use for the path. In the depicted example, the candidate actions determined to be included in the path include a first, second, and third candidate action, i.e., candidate actions 120, 122, and 124, respectively. The tree search may determine a candidate action from among a set of candidate actions to include as part of the path at an interval of time or distance from a current position of the vehicle or distance along a route. The set of candidate actions from which the tree search determines an action to include in the path may include canonical candidate actions and/or dynamically-generated candidate actions. Canonical candidate actions may include "typical" actions, such as maintaining a previous trajectory of the vehicle, executing a left or right lane merge trajectory, executing a left or right turn, braking to a stop, accelerating to a maximum legal limit, a trajectory that is parallel with a current or next lane reference, and/or the like. In additional or alternate examples, tree search component 114 and/or planning component 112 may determine additional or alternate candidate actions to include in the set that may vary from the canonical candidate actions where these additional or alternate candidate actions may be based at least in part on sensor data and/or environment data that may be based at least in part on perception data. In some examples, canonical or additional candidate actions may be screened out based at least in part on the environment data, such as those candidate actions that would overlap with space (currently or predicted to be) occupied by a dynamic object or static object. After selecting a candidate action for inclusion in the path, the tree search may determine a prediction node associated with that candidate action that indicates a predicted state of the vehicle and/or the environment and a new set of candidate actions that are based on that predicted state, and so on until a planning horizon (e.g., in time or distance) is met.

The depicted candidate actions may be just three candidate actions of a plurality of candidate actions and, although FIG. 1 depicts them as being straight lines, the candidate actions may be curvilinear. For example, a candidate action may indicate a lane reference that runs parallel with a lane, a canonic maneuver (e.g., left and right turns of different kinds, such as associated with different intersection types; an emergency maneuver), etc. A candidate action may identify a pose (i.e., position and orientation), velocity, and/or acceleration for the controller(s) 116 to accomplish. The candidate action(s) determined by the tree search component 114 as part of the path may further be associated with a future time and/or distance from a current time and/or position of the vehicle 102.

For example, if a first candidate action chosen by the tree search indicates a same velocity and a position directly in front of the current motion of the vehicle, the controller(s) 116 may track that first candidate action by determining controls suitable to actuate the drive components in a same manner that they are currently being actuated. Whereas, if a second candidate action subsequent to the first candidate action in time and/or distance identifies a position and/or orientation that deviates from current motion of the vehicle and the first candidate action, after controller(s) 116 have reached a first time and/or first position associated with the first candidate action, the controller(s) 116 may determine controls suitable to bring the vehicle 102 to the state indicated by the second candidate action, subject to constraints imposed by the controller profile determined by the tree search. This may include changing a steering rate of a wheel and/or accelerating/decelerating subject to the controller profile determined by the tree search. In some examples, both a candidate action and controller profile may be determined per time/distance along the path being generated, meaning that the controller profile determined and applied to the controller(s) 116 may change at different times/distances. Additionally or alternatively, the controller profile may be determined for all of the candidate actions making up the path or for every n number of candidate actions making up the path, where n is a positive integer. The controls and resultant actuation of the drive components are caused by the controller(s) 116 to move the vehicle from a current state to a next state indicated by a candidate action. In other words, the controller(s) may determine a trajectory 126 for controlling operations of the vehicle sufficient to track a path comprising candidate actions determined by the tree search 114.

In the depicted example, the trajectory 126 determined by the controller(s) 116 tracks a path output by the tree search component 114 comprising candidate action 124 for a first time and/or distance and candidate action 120 for a second time and/or distance. For example, the tree search component 114 may determine to transition from a current trajectory (i.e., candidate action 122) to candidate trajectory 124 by a first time/distance to avoid obstacle 134 and to subsequently transition from candidate action 124 at the first time/distance to candidate action 120 at a second time/distance to avoid obstacle 136. The trajectory 126 determined by the controller(s) 116 may cause the vehicle to transition/move from a current pose and/or velocity associated with candidate action 122 to a pose and/or velocity associated with candidate action 124 at the first time/first distance, subject to a first controller profile, and to subsequently transition to a pose and/or velocity associated candidate action 120 at the second time/second distance, subject to a second controller profile. The first controller profile and the second controller profile may be the same or different, depending on the output of the tree search component 114.

The controller(s) 116 may determine controls to actuate drive components of the vehicle 102 to accomplish the path determined by the tree search component 114. There may be a single controller per vehicle that controls the drive components of the vehicle, a controller per side of the vehicle that work in tandem, or a controller per driving unit that work in tandem. In some examples, the controller(s) 116 may comprise software and/or hardware for actuating drive components of the vehicle 102 sufficient to track the candidate action(s) indicated in the path generated by the tree search component 114. In some examples, the trajectory 126 may be associated with controls sufficient to control the vehicle 102 over a time horizon (e.g., 5 milliseconds, 10 milliseconds, 100 milliseconds, 200 milliseconds, 0.5 seconds, 1 second, 2 seconds, etc.) or a distance horizon (e.g., 1 meter, 2 meters, 5 meters, 8 meters, 10 meters). The time or distance units over which the controls are generated may be the same or different than the time or distance units with which candidate actions are associated in the tree search. For example, the path may indicate a rough path that indicates a candidate action to be tracked at intervals of time or distance that are greater than the time or distance intervals for which the controller(s) 116 generate the controls for tracking the candidate actions. Alternatively, the time or distance intervals at which the controller(s) 116 generate the controls may be the same as the tree search intervals.

As discussed above, the tree search component 114 output may indicate a controller profile 118 for the controller 116 to use in tracking the path. Additionally or alternatively, the tree search component 114 may determine different controller profiles for different actions indicated in the path output by the tree search component 114. The properties of a controller profile 118 may result in the trajectory 126 implemented by the controller(s) 116 since the controller profile 118 sets characteristics of the controller(s) 116 for tracking the path. The tree search may determine to use a particular controller profile 118 in association with an action in the path. Determining to use that controller profile 118 causes a change in the operating parameters of the controller(s) 116 (e.g., by transmitting an instruction to the controller(s) 116, via controls for the controller(s) 116), which may ultimately result in changing the trajectory 126 itself. For example, a controller profile may include an acceleration limit, additionally or alternatively a jerk limit, and additionally or alternatively a gain. A first controller profile may have a lower acceleration limit, jerk limit, and/or maximum gain than a second controller profile, which may cause the vehicle 102 to track to a candidate action more slowly than the second controller profile. In other words, the second controller profile may transition from a first candidate action to a second candidate action faster, which may be useful for squeezing past a tight space, an emergency maneuver, or the like, whereas the first controller profile may transition between actions of the path more smoothly.

The tree search component 114 may explore different combinations of a candidate action with different controller profiles. In some examples, the memory 108 may store multiple different controller profile(s) 118, each having different properties. Additionally or alternatively, a controller profile 118 may be dynamically determined and/or may be modified based at least in part on sensor data, perception data, and/or vehicle state data. For example, a controller profile may be scaled based on current vehicle speed, detected object density, detected construction zone, and/or the like. In some examples, a controller profile 118 may be associated with particular perception data, such that detecting the presence of an environment state, such as detecting an object of a certain classification, detecting an environment type (e.g., dense urban driving, dense pedestrian zone, construction zone, school zone), and/or the like, may cause that controller profile 118 to be added to the set of controller profiles included in the tree search. Additionally or alternatively, upon detection of particular perception data, the vehicle 102 may exclude one or more controller profiles from the set of controller profiles included in the tree search, such as excluding a controller profile configured to maximize passenger comfort for an environment state where quicker maneuvers or tighter tolerances in maneuvers to avoid objects may be necessary.

A candidate action may be associated with an action node in the tree search generated by the tree search component 114. For example, candidate action 120 may be indicated by action node 128 in the tree search. The tree search component 114 may generate a set of action nodes based on a previous prediction node. Except for the root node 130, which is a special prediction node that indicates the current state of the vehicle and/or the environment, a prediction node may indicate a predicted state of the vehicle and/or the environment that would result from implementing a particular candidate action subject to a particular controller profile. For example, prediction node 132 may indicate a first predicted state of the vehicle and/or the environment that may result from implementing a first candidate action indicated by action node 128, using controller profile 118(1). A second prediction node may indicate a second predicted state of the vehicle and/or the environment based on implementing the first candidate action, using controller profile 118(o), where o is a positive integer. Accordingly, a prediction node may be determined for up to each candidate action and controller profile combination.

In some examples, a prediction component of the vehicle 102 may receive sensor data and/or perception data and may determine a predicted state of dynamic objects in the environment. In some examples, dynamic objects may include objects that move or change states in some way, like traffic lights, moving bridges, train gates, and the like. The prediction component may use such data to predict a future state, such as a signage state, position, orientation, velocity, acceleration, or the like, which collectively may be described as prediction data. In some examples, this prediction component may determine a prediction node 132 based at least in part on an action node 128 and controller profile. In some examples, a simplified version of an output of the prediction component may be used to determine a prediction node, such as a Kalman filter.

The planning component 112 may use the perception data received from perception component 110 and/or prediction data received from the prediction component, to determine one or more trajectories, control motion of the vehicle 102 to traverse a path or route, and/or otherwise control operation of the vehicle 102, though any such operation may be performed in various other components (e.g., localization may be performed by a localization component, which may be based at least in part on perception data). For example, the planning component 112 may determine a route for the vehicle 102 from a first location to a second location; and generate, based at least in part on the perception data (which may further include predictions regarding detected objects in such data), a path for controlling motion of the vehicle 102 (e.g., using the tree search) in accordance with a receding horizon technique (e.g., 1 micro-second, half a second) to control the vehicle to traverse the route (e.g., in order to avoid any of the detected objects). In some examples, the tree search component 114 may determine which action and controller profile to choose at each level of the tree based at least in part on environment data generated from sensor data captured by sensor(s) 104. For example, the perception component 110 may generate all or part of environment data, which may comprise static data and/or dynamic data. For example, the static data may indicate a likelihood that an object exists and/or will exist at a location in the environment and the dynamic data may indicate a likelihood that an object occupies and/or will occupy a location in the environment. In some instances, the dynamic data may comprise multiple frames associated with different times steps at intervals up to a prediction horizon (i.e., a maximum time/distance for which dynamic data is predicted).

Example System

Figure 2:
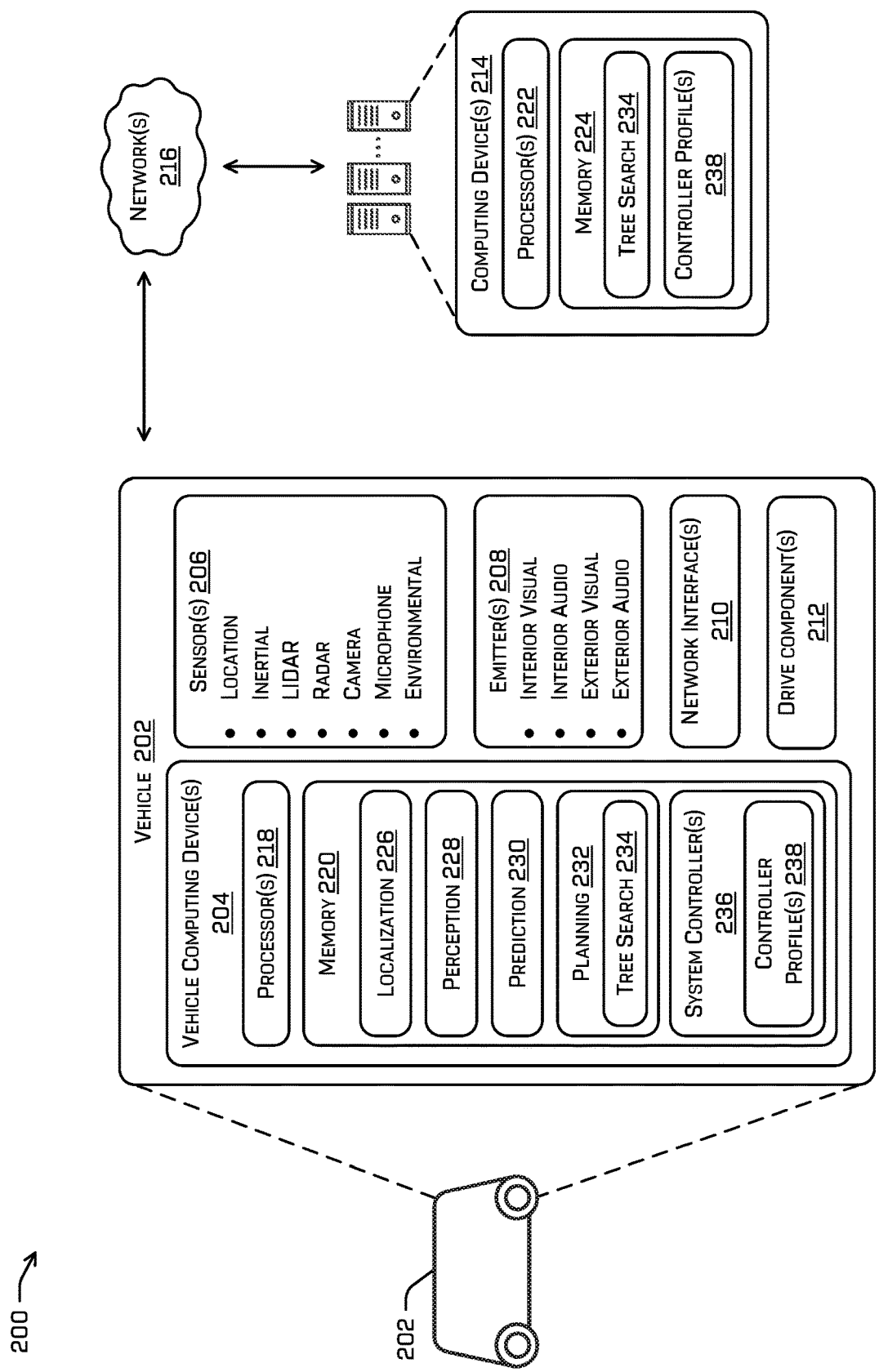
FIG. 2 illustrates a block diagram of an example autonomous vehicle architecture comprising a tree search and dynamic controller profile for vehicle path planning.

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, network interface(s) 210, and/or drive component(s) 212. Vehicle computing device(s) 204 may represent computing device(s) 106 and sensor(s) 206 may represent sensor(s) 104. The system 200 may additionally or alternatively comprise computing device(s) 214.

In some instances, the sensor(s) 206 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214. The position associated with a simulated sensor, as discussed herein, may correspond with a position and/or point of origination of a field of view of a sensor (e.g., a focal point) relative the vehicle 202 and/or a direction of motion of the vehicle 202.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface(s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 802.11 standards, short range wireless frequencies such as ultra-high frequency (UHF), cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Memory 220 may represent memory 108. Computing device(s) 214 may also include processor(s) 222, and/or memory 224. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), tensor processing units (TPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 220 and/or 224 may be examples of non-transitory computer-readable media. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, prediction component 230, planning component 232, tree search component 234, system controller(s) 236, and/or controller profile(s) 238—zero or more portions of any of which may be hardware, such as GPU(s), CPU(s), TPU(s), and/or other processing units. Perception component 228 may represent perception component 110, planning component 232 may represent planning component 112, the tree search component 234 may represent tree search component 114, system controller(s) 236 may represent controller(s) 116, and controller profile(s) 238 may represent controller profile(s) 118.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s) of an environment (which may be stored in or streamed to memory 220), and can continuously determine a location, velocity, and/or orientation of the autonomous vehicle within the map(s). In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some examples, the localization component 226 may determine localization and/or mapping data comprising a pose graph (e.g., a sequence of position(s) and/or orientation(s) (i.e., pose(s)) of the vehicle 202 in space and/or time, factors identifying attributes of the relations therebetween, and/or trajectories of the vehicle for accomplishing those pose(s)), pose data, environment map including a detected static object and/or its distance from a pose of the vehicle 202, and/or the like In some instances, the localization component 226 may provide data to various components of the vehicle 202 to determine an initial position of an autonomous vehicle for generating a trajectory and/or for generating map data. In some examples, localization component 226 may provide, to the perception component 228, prediction component 230, and/or tree search component 234 a location and/or orientation of the vehicle 202 relative to the environment and/or sensor data associated therewith.

In some instances, perception component 228 may comprise a primary perception system and/or a prediction system implemented in hardware and/or software. The perception component 228 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. The perception component 228 may include a prediction component that predicts actions/states of dynamic components of the environment, such as moving objects, although the prediction component may be separate, as in the illustration. In some examples, the perception component 228 may determine a top-down representation of the environment that encodes the position(s), orientation(s), velocity(ies), acceleration(s), and/or other states of the objects in the environment. For example, the top-down representation may be an image with additional data embedded therein, such as where various pixel values encode the perception data discussed herein. Data determined by the perception component 228 is referred to as perception data.

The prediction component 230 may predict a future state of an object in the environment surrounding the vehicle 202. For example, the future state may indicate a predicted object position, orientation, velocity, acceleration, and/or other state (e.g., door state, turning state, intent state such as signaling turn) of that object. Data determined by the prediction component 230 is referred to as prediction data. In some examples, the prediction component 230 may determine a top-down representation of a predicted future state of the environment. For example, the top-down representation may be an image with additional data embedded therein, such as where various pixel values encode the prediction data discussed herein. Data determined by the prediction component 230 may be referred to as prediction data.

The planning component 232 may receive a location and/or orientation of the vehicle 202 from the localization component 226 and/or perception data from the perception component 228 and may determine instructions for controlling operation of the vehicle 202 based at least in part on any of this data. In some examples, the memory 220 may further store map data, which is undepicted, and this map data may be retrieved by the planning component 232 as part of generating the environment state data discussed herein. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic, such as may be generated by system controller(s) of the drive component(s) 212)) that the drive component(s) 212 may parse/cause to be carried out, second instructions for the emitter(s) 208 may be formatted according to a second format associated therewith). In some examples, where the planning component 232 may comprise hardware/software-in-a-loop in a simulation (e.g., for testing and/or training the planning component 232), the planning component 232 may generate instructions which may be used to control a simulated vehicle. These instructions may additionally or alternatively be used to control motion of a real-world version of the vehicle 202, e.g., in instances where the vehicle 202 runs the simulation runs on vehicle during operation.

In some examples, perception data and/or prediction data may be provided as input to the tree search component 234. In an additional or alternate example, the tree search component 234 may include a Kalman filter or other simple prediction component for determining a prediction node that may be used instead of the prediction data, although in another example, the prediction component 230 may determine prediction data for the tree search component 234 to determine a prediction node.

In some examples, the planning component 232 may be a primary component for determining control instructions for the vehicle 202, such as during operation of the vehicle 202 in nominal conditions. In some examples, the planning component 232 may comprise a tree search component 234 for determining the control instructions. Tree search component 234 may determine a path for controlling the vehicle by determining one or more candidate actions as part of a tree search, which may include, for example, a Markov decision process (MDP), partially-observable MDP (POMDP), value iteration, lexicographic value iteration (LVI), Dynamic A*, A*, LPA*, Dijkstra's algorithm, and/or the like.

The tree search component 234 may execute the tree search discussed herein and may manage determining the action node(s) and/or prediction node(s) of the tree search by transmitting a request for the planning component to generate candidate action(s) based at least in part on an environment determined in association with a prediction node. The tree search component 234 may receive an initial state of the environment from the perception component 228 (i.e., in association with a root node of the tree search)—the tree search component 234 may transmit this initial environment state to the planning component 232 and may receive one or more candidate actions from the planning component 232 that may be based at least in part on sensor data and/or an initial state of the environment. Additionally or alternatively, the tree search component 234 may retrieve one or more canonical candidate actions from memory 220, which may include typical actions including maintaining a last action of the vehicle, executing a lane change, executing a turn, stopping, accelerating to a speed limit, and/or the like.

The tree search component 234 may transmit at least one of these candidate actions to a simulation component of the tree search component 234 and/or the prediction component 230, which may determine a predicted state of the environment that is based at least in part on the candidate action and a controller profile 238. Based on the results of the simulation and/or prediction, the tree search component 234 may determine a cost associated with a candidate action, as implemented by the controller's use of controller profile 238, and may select a candidate action for exploration (exploring further candidate action(s) based on the selected candidate action) and/or for implementation. This process may be iterated until a time horizon, distance, progress along a route, target position, and/or suitable path is reached/ determined. Moreover, the tree search component 234 may explore different combinations of a candidate action with different controller profiles, which may result in different costs, as discussed herein.

For example, the time horizon may be a length of time into the future from a current time (e.g., 500 milliseconds, 1 second, 2, seconds, 5 seconds, 8 seconds, 10 seconds). This length of time may be associated with controlling the vehicle for the next m units of time, where m is a positive integer. A distance may define a total distance covered by the constituent actions that make up a path, whereas progress along a route may be the displacement along/with reference to a route. In an additional or alternate example, a target position may be used to terminate the tree search. For example, upon determining a path that reaches the target position in the environment, the tree search may output that path and terminate. In an additional or alternate example where the tree search component may be used when a nominal planning component failed to create a valid trajectory or path, the tree search component 234 may terminate upon determining a valid path (e.g., a path that is impact-free and conforms to a rule set, which may specify comfort metrics, conformance to laws). In additional examples, iterations may continue until an objective is achieved (e.g., a successful lane change, a successful merge, reaching an endpoint, or any other completed action). In any one or more examples, any combination of the above may further be used as decision points for branching the tree.

A simulation component of the tree search component 234 may determine a simulation of the environment and/or the vehicle 202, such as simulating execution of a candidate action by the vehicle 202 and a predicted state of the environment based at least in part on the passage of time, progress of the vehicle, and response to execution of the candidate action by the vehicle 202 by any dynamic object(s) in the environment. For example, the simulation may comprise a representation of a position, orientation, movement, and/or quality of portions of the environment and/or the vehicle 202. The environment may comprise an agent, such as another vehicle, a pedestrian, vegetation, a building, signage, and/or the like. In some examples, the simulation component may receive a candidate action, controller profile 238, and/or environment state (which may be a current environment state determined by the perception component 228 and/or a predicted environment state determined by the prediction component of the perception component). The simulation component may use this data to determine a predicted state of the vehicle, object(s), and/or the environment responsive to the candidate action, i.e., should the candidate action be carried out by the vehicle 202.

Ultimately, the tree search component 234 may determine a contiguous path through the sets of nodes that is associated with a lowest cost or a cost that is below a threshold cost. A contiguous path of action nodes is a set of nodes that are connected by a dependency in a data structure generated by the tree search. For example, the data structure may comprise a directed acyclic graph (DAG), Markov decision process (MDP), partially-observable MDP (POMDP), and/or the like. Intervening prediction nodes are not taken into account for the sake of path planning beyond the costs they may indicate. Two action nodes are dependent when they are connected by an intervening prediction node, which indicates that the lower-level action node starts from an end position of the higher-level action node.

The tree search may conduct a search for the path from the root node to a last layer of the data structure. Conducting the search may comprise determining a contiguous set of connections between nodes of the different sets of nodes from the root node to an action node in a deepest layer of the data structure. Determining the path may comprise searching for solutions in the multivariate space that maximize a combination of displacement along the route and lateral/azimuthal diversity among the solutions (or meet a diversity heuristic) and minimize cost based at least in part on the cost map in the time interval given. For example, the search algorithm may comprise an algorithm such as, for example D*, D*lite, Focused Dynamic A*, A*, LPA*, Dijkstra's algorithm, and/or the like, although other search algorithms for searching and/or generating a directed graph and/or a weighted directed graph may be used. In some examples, the search may be configured with a ruleset that may comprise one or more rules, e.g., specifying a boundary within which to determine the path (e.g., the boundary may be determined based at least in part on sensor data and/or a map), node connection rules (e.g., nodes may have only one parent node), and/or the like. In some examples, the search may comprise determining a directed graph between nodes of the sets of nodes. The directed graph may comprise a connection (e.g., edge) between a first node and a second node and/or weight (e.g., cost) associated with the connection.

The tree search discussed herein may determine the cost associated with a candidate action using a particular controller profile may be based at least in part on a trajectory that would result from implementing the candidate trajectory using the controller profile 238. For example, the cost may be based at least in part on a prediction of how close the candidate action would cause the autonomous vehicle to pass static object(s) and/or dynamic object(s); a proximity of the autonomous vehicle to non-drivable surface(s); a velocity, acceleration, and/or jerk associated with the candidate action; a short-term goal cost (e.g., displacement/progress along a route, parking, achieving a soft objective indicated by a teleoperations device—i.e., an objective that the autonomous vehicle is not required to meet but is factored into the cost determination to increase a likelihood of the autonomous vehicle operating in a particular manner); conformance of the candidate action to rules of the road and/or other legal implications of implementing the candidate action; a likelihood of impact with an object; an acceleration required to avoid impact; a time until impact; a predicted likelihood of impact; driving dynamics (e.g., the feasibility of a maneuver, the likelihood of weather or other environmental conditions to impinge on execution of the candidate action), and/or the like.

Since changing the controller profile of the controller(s) 236 changes operational characteristics of the controller(s) 236, the predicted trajectory that a controller is likely to effectuate to accomplish an action may change between different controller profiles. This may result in the cost associated with a candidate action and controller profile to be different than the same candidate action and a different controller profile. Taking just one of the factors that may be used to determine the cost, the closest that a trajectory would get to an object, one can see that two different controller profiles may cause the controller(s) 236 to track to that candidate action more or less slowly, ultimately increasing or reducing that minimum distance. This would ultimately potentially result in a different cost between two different controller profiles despite the candidate action being the same.

The memory 220 and/or 224 may additionally or alternatively store a mapping system, a planning system, a ride management system, simulation/prediction component, etc.

As described herein, the localization component 226, the perception component 228, the prediction component 230, the planning component 232, tree search component 234, and/or other components of the system 200 may comprise one or more ML models. For example, localization component 226, the perception component 228, the prediction component 230, and/or the planning component 232 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, Xception, ConvNeXt, and the like; visual transformer(s) (ViT(s)), such as a bidirectional encoder from image transformers (BEiT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like; visual transformer(s) (ViT(s)), such as a bidirectional encoder from image transformers (BEiT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like; VQGAN; and/or general or natural language processing transformers, such as BERT, RoBERTa, XLNet, GPT, GPT-2, GPT-3, GPT-4, or the like and/or general or natural language processing transformers, such as BERT, GPT, GPT-2, GPT-3, or the like. In some examples, the ML model discussed herein may comprise PointPillars, SECOND, top-down feature layers (e.g., see U.S. Pat. No. 10,649,459, filed Apr. 26, 2018, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

Memory 220 may additionally or alternatively store one or more system controller(s) 236 (which may be a portion of the drive component(s)), which may be configured to control steering, propulsion, braking, safety, emitters, communication, and other systems of the vehicle 202. In some examples, the system controller(s) 236 may comprise additional or alternate hardware apart from memory 220 for interfacing with the drive component(s). In other words, the system controller(s) 236 may be stored in memory 220 totally, in part, or not at all, as the system controller(s) 236 may include hardware separate from memory 220. The system controller(s) 236 may communicate with and/or control corresponding systems of the drive component(s) 212 and/or other components of the vehicle 202. For example, the planning component 232 may generate instructions based at least in part on perception data generated by the perception component 228 and transmit the instructions to the system controller(s), which may control operation of the vehicle 202 based at least in part on the instructions. These instructions may be a path determined by the tree search 234. In some examples, the controls exercised by the controller(s) 236 may be mechanical (e.g., pneumatic, hydraulic), electrical, and/or the like, depending on the receiving system(s) of the drive component(s) 212.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Example Candidate Actions Generated for Explored States of the Vehicle

Figure 3:
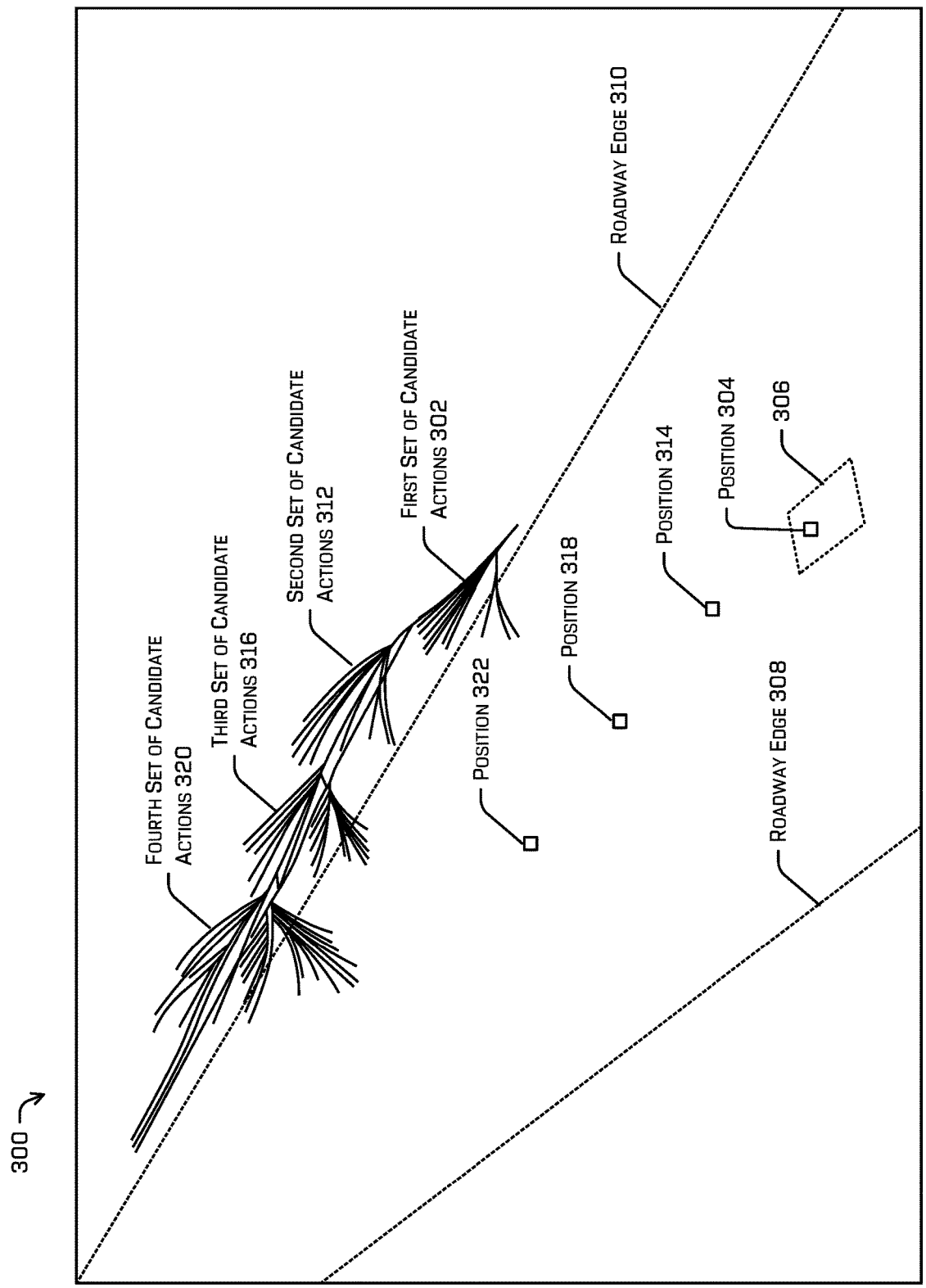
FIG. 3 illustrates an example three-dimensional representation of sets of different candidate trajectories generated for a branch of the tree search.

FIG. 3 illustrates a three-dimensional representation 300 of four different sets of candidate actions generated at four different action node layers of the tree search along a single branch of a tree search. The first set of candidate actions 302 may have been generated based at least in part on a position 304 of the vehicle. These candidate actions 302 may additionally or alternatively be determined based at least in part on an orientation, velocity, acceleration, steering rate, and/or perception data received from the perception component indicated in association with a root node (as discussed in more detail above regarding static/dynamic objects, etc.) associated with operation of the vehicle. The space occupied by the vehicle is represented at 306 as a dashed line. FIG. 3 also represents two roadway edges, roadway edge 308 and roadway edge 310. The height of a candidate action indicates a velocity and/or acceleration associated with the candidate action.

A second set of candidate actions 312 may be generated based at least in part on selecting a first candidate action of the first set of candidate actions 302 for exploration and based at least in part on a final position 314, orientation, velocity, steering rate, etc. that the first candidate action would cause the vehicle to accomplish upon concluding execution of the first candidate action and environment state data. The second set of candidate actions 412 may additionally or alternatively be determined based at least in part on environment state data indicated by prediction node determined based at least in part on the first candidate action.

The third set of candidate actions 316 may similarly be based at least in part on selection of a second candidate action from among the second set of candidate actions 312; environment state data generated in association therewith; and/or the final position 318, orientation, velocity, steering rate, etc. that the second candidate action would affect. The fourth set of candidate actions 320 may similarly be based at least in part on selection of a third candidate action from among the third set of candidate actions 316; environment state data generated in association therewith; and/or the final position 322, orientation, velocity, steering rate, etc. that the third candidate action would affect.

Example Controller Profile Control Characteristics

Figure 4:
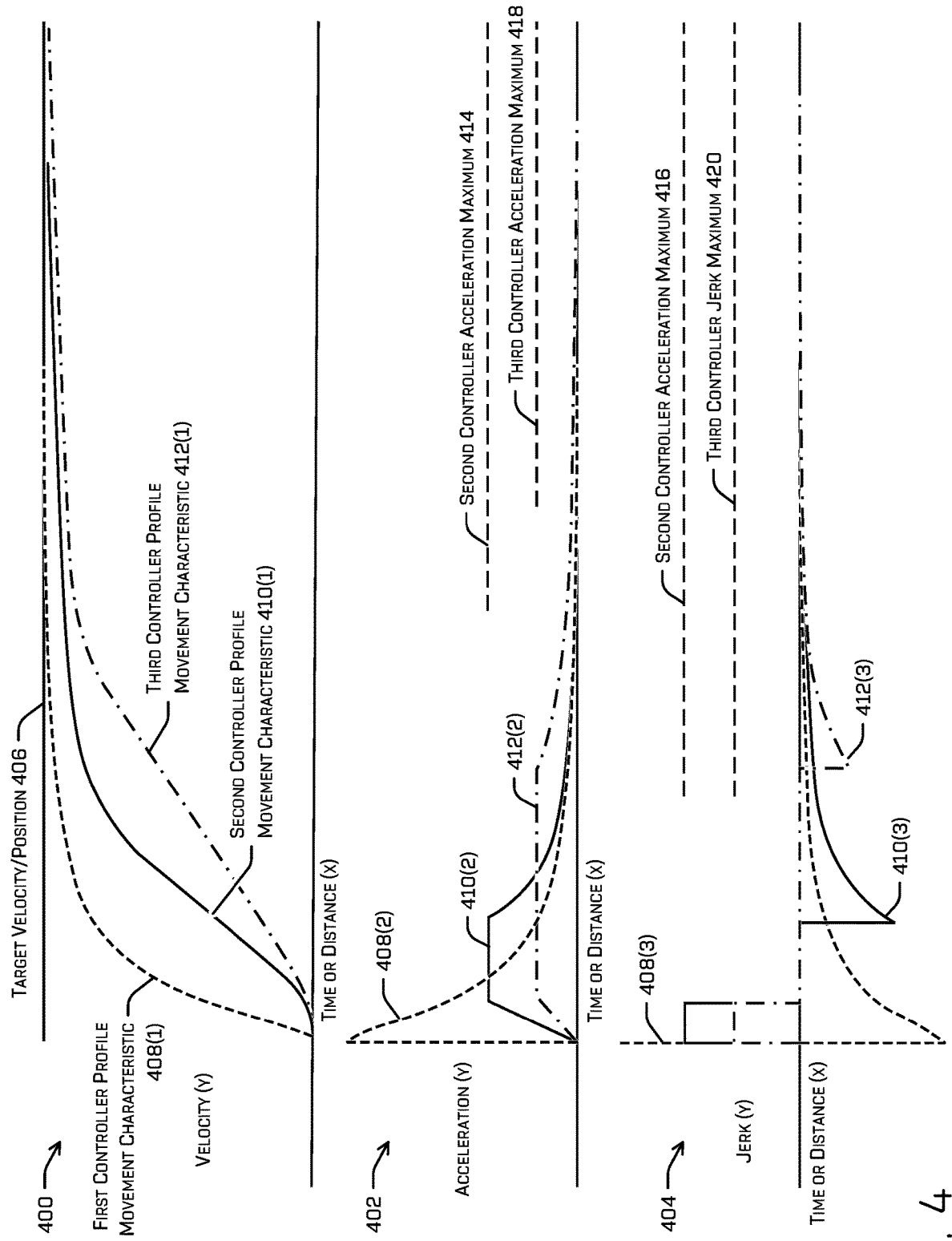
FIG. 4 illustrates graphs of example velocities, accelerations, and jerks accomplished by different controller profiles for tracking a transition between candidate actions.

FIG. 4 illustrates graphs of example velocities, accelerations, and jerks accomplished by different controller profiles for tracking a transition between two candidate actions. FIG. 4 includes a first graph 400 illustrating velocities over time or distance for three different controller profiles, a second graph 402 illustrating accelerations over time or distance for three different controller profiles, and a third graph 404 illustrating jerks over time or distance for the three different controller profiles. The characteristics of movement depicted in the three graphs may result from a controller transitioning from a first candidate action to a second candidate action, i.e., tracking the second candidate action from a first state associated with the first candidate action. The difference between the graphs illustrates how the different controller profiles may affect the velocity, acceleration, and jerk for the same transition between candidate actions. Example graph 400 also depicts a target velocity at a target position 406 defined by the candidate action that the vehicle is transitioning to and that the controller is tracking to.

The three controller profiles depicted include a first controller profile that is gain-controlled exclusively. Such a controller may control acceleration of the drive unit(s) of the vehicle subject to:

$$a_{cmd}(k) = -k_d(v(k) - v_{ref}(k)) + a_{ref}(k) \quad (1)$$

where $a_{cmd}(k)$ is the acceleration controls to apply to the drive unit(s) of the vehicle at a k-th time or distance step, $k_d$ is a gain, $v(k)$ is a current velocity of the vehicle, $v_{ref}$ is a reference velocity (i.e., a target velocity of the vehicle that the tree search has determined for the controller to achieve by the k-th step), and $a_{ref}$ is a reference acceleration (i.e., a target acceleration to be achieved at the k-th step. In tracking to candidate action, this first controller demonstrates a steep high velocity to start, as can be seen at the first controller profile movement characteristic 408(1), which may be velocity of the vehicle over time and/or distance. The acceleration and jerk for the first controller profile may demonstrate infinite or near infinite properties, bounded only by the driving mechanics and what they are able to achieve, as can be seen in the left-most portions of the first controller profile movement characteristics 408(2) and 408(3). This may result in an uncomfortable movement for passengers, but can be used for evasion maneuvers.

The tree search's cost function may cause the tree search to select the first controller profile in a situation where the safety cost savings end up overwhelming the high comfort costs associated with this less comfortable maneuver, such as in an emergency or evasive maneuver situation. For example, such a situation may include when a pedestrian or vehicle makes a sudden movement that requires the vehicle to take evasive action. In such an example, the comfort costs for the second and third controller profiles may be lower than the comfort cost associated with the first controller profile but their safety costs may be prohibitively high, whereas the comfort cost for the first controller profile may be high but not so high that the lower safety costs of using the first controller in an evasion or emergency scenario result in a lower total cost than the total costs associated with the second and third controller profiles in such a situation.

The second controller profile and third controller profile may each include an acceleration limit and/or jerk limit, whereas the first controller profile may contain no such limit. The second controller profile and/or third controller profile may additionally or alternatively include a gain. In an example where the controller profiles each include a gain, these gains may be the same or different. In some examples, the gains discussed herein may be adjusted based at least in part on vehicle state data and/or environment state data, as discussed above. A first acceleration limit 414 and/or first jerk limit 416 associated with the second controller profile may be greater than a second acceleration limit 418 and/or second jerk limit 420 associated with the third controller profile. Note that the depicted limits may be just one component of the limits, as a limit may comprise a maximum, a minimum, or both. The velocities resulting from implementation of the second controller profile (410(1)) and third controller profile (412(1)) are both less intense and demonstrate a lower slope overall than the velocities exhibited by the first controller profile (408(1)), particularly at the start of the transition at the left-most portion of graph 400.

Moreover, the lower acceleration limit and/or jerk limit of the third controller may result in a more smooth and comfortable transition between actions, as can be seen be the low slope in the velocities 412(1) compared to both the second controller profile's velocity 410(1) and especially compared to the first controller profile velocities 408(1). In some examples, the third controller profile may be a nominal controller profile used for most driving, whereas the second controller profile may be selected by the tree search for tight tolerance and/or light evasive action and the third controller profile may be selected by the tree search for evasive and/or emergency maneuvers, all of which may be determined by the cost function of the tree search as discussed herein.

The second graph 402 and third graph 404 both demonstrate the effects of capping the acceleration and jerk, respectively, by using the second and third controller profiles. Whereas the acceleration of the first controller 408(2) goes to near-infinite, the acceleration that results from using the second controller 410(2) and the third controller 410(3) is capped by their respective acceleration limits (and/or jerk limits), resulting in the slower velocities/shallower slopes of velocities seen in graph 400. A similar effect can be seen for jerk in graph 404 where the jerk for the first controller 408(3) goes near-infinite at the far-left, whereas the jerks associated with the second controller 410(3) and third controller 412(3) are capped by the controller jerk limits of the respective controllers.

The second controller and first controller may control acceleration of the drive unit(s) of the vehicle subject to:

$$j_{cmd}(k) = -k_d(v(k)-v_{ref}(k)) - k_{dd}(a(k)-a_{ref}(k)) + j_{ref}(k) \quad (2)$$

and/or $$a_{cmd}(k) = a(k) + dt j_{cmd}(k). \quad (3)$$

According to this implementation, the controller may still output acceleration controls, but they would be subject to the jerk and acceleration controls determined by equations (2) and (3), where equation (3) may be dependent on equation (2) in an example where a jerk limit is used. To give an example of the differences between the second controller profile and the third controller profile, the second controller profile may have a first gain, $k_d$, of 4; second gain, $k_{dd}$, of 4; a maximum jerk of $$5.0 \frac{m}{s^3};$$

a minimum jerk of $$-5 \frac{m}{s^3};$$

and a maximum/minimum acceleration of $$\pm 5.5 \frac{m}{s^2}$$

and the third controller profile may have a first gain, $k_d$, of 1; second gain, $k_{dd}$, of 2; a maximum jerk of $$2.0 \frac{m}{s^3};$$

a minimum jerk of $$-2 \frac{m}{s^3};$$

a and a maximum/minimum acceleration of $$\pm 2.5 \frac{m}{s^2}.$$

In some examples, the gain and/or the limits associated with a particular profile may be dynamically changed based at least in part on perception data and/or a vehicle state. For example, the limits and/or gains may be scaled based at least in part on vehicle current velocity and/or acceleration and/or detected perception data.

Figure 5:
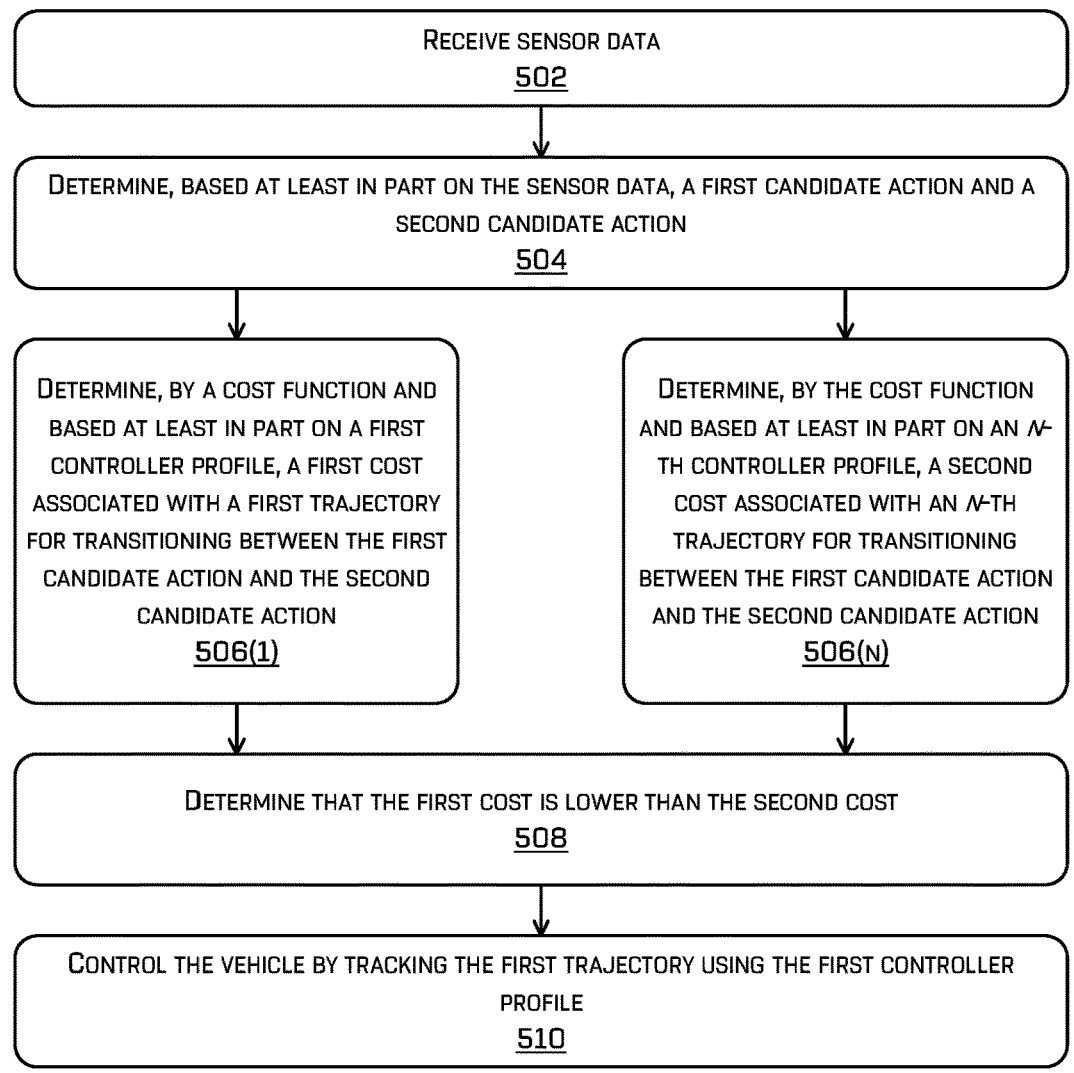
FIG. 5 illustrates a flow diagram of an example process for determining a candidate action(s) and a controller profile and trajectory for transitioning between candidate actions.

Example Process for Dynamically Controlling a Controller Profile for Tracking a Path FIG. 5 depicts an example process 500 for generating a trajectory or a path (e.g., two or more contiguous trajectories) for controlling an autonomous vehicle using a tree search. Example process 500 may include determining an action for the vehicle to take and a controller profile and trajectory for tracking that action. In some examples, a planning component of the vehicle 202 may execute process 500, such as by one or more CPU(s), GPU(s), TPU(s), and/or other processing units (e.g., ASIC(s), FPGA(s)). In some examples, the tree search discussed herein may be structured as a Markov decision process (MDP), partially-observable MDP (POMDP), a directed acyclical graph (DAG), upper confidence bounds applied to trees (UCT), determinized sparse partially observable tree (DESPOT); or the like for modeling control states (action nodes) and environment states (prediction nodes) in the tree search. In some examples, the process 500 may be based at least in part on sensor data, perception data, and/or a route. For example, the vehicle may determine or receive a route associated with a start position and an end position in an environment. The start position may be associated with a current position of the vehicle and the route may specify an end position, such as a passenger pickup or drop-off zone, and may, in some examples, include intervening targets or operations, such as exiting a freeway, seeking to stay in a particular lane, targeting parking on a particular block (but not a particular position, although in some examples, a particular portion of the block may be identified), etc.

At operation 502, example process 500 may comprise receiving sensor data from one or more sensors, according to any of the techniques discussed herein. The sensor(s) may be associated with the vehicle and/or another computing device. Operation 502 may additionally or alternatively comprise determining environment state data based at least in part on the sensor data. In some examples, the perception component may determine the environment state data. The environment state data may be associated with a most recently received set of sensor data (e.g., a current time, although there may be a small delay between receiving the sensor data and determining the perception data).

Such environment state data may comprise a position, orientation, and/or characteristics of the vehicle in the environment, which may correspond to real-time operation of an autonomous vehicle. The environment state data may additionally or alternatively comprise an indication of an object classification associated with one or more detected objects and/or characteristics associated with the one or more objects (e.g., a position, velocity, acceleration, heading, material type, kinematic coefficient). The environment state data may comprise a two-dimensional image, although, in additional or alternate examples, the environment state data may comprise a data structure, such as a pub-sub message, a three-dimensional representation, and/or the like. In some examples, the environment state data may further comprise a prediction of whether an occluded object exists, as discussed in more detail in U.S. Pat. No. 11,231,481, filed May 8, 2019, the entirety of which is incorporated by reference herein for all purposes. In an additional or alternate example, the prediction of whether an occluded object exists may be determined by a machine-learned model that receives the environment state data as input and outputs a field of likelihoods. Any region of the environment associated with a likelihood that meets or exceeds a threshold may be output as a potential false negative, which may be used as part of the candidate action generation.

The environment state data may comprise an object classified by the perception component as being dynamic. For example, a dynamic object, which may also be referred to herein as an agent, may comprise a vehicle, a bicyclist, pedestrian, a ball, a wind-blown plastic bag, and/or any other moveable object or object that is likely to move within a time period. An object such as a bench or table may be moveable but, in a time period relevant to operation of the vehicle, is unlikely to move and may be considered a static object. The environment state data may include dynamic object(s) and may include a dynamic object classification and/or likelihood determined by the agent filter in association with a dynamic object. For example, the classification may include whether a dynamic object is passive or reactive and/or a likelihood thereof, as discussed in more detail in U.S. Patent Application Publication No. 2023/0041975, filed Aug. 4, 2021, the entirety of which is incorporated by referenced herein for all purposes. An agent filter, as described in U.S. Patent Application Publication No. 2023/0041975, may comprise an ML model trained to receive an object track associated with a dynamic object, a current state of the vehicle and/or a candidate action as discussed further herein, and/or sensor data associated with the dynamic object and determine, by a neural network or any of the other ML techniques discussed above, a classification and/or a confidence score (e.g., a posterior probability, a likelihood) that a dynamic object is passive or reactive. In some examples, if the confidence score determined by the ML model meets or exceeds a confidence threshold, the detected object may be classified as a reactive object; otherwise, the detected object may be classified as a passive object. In yet another example, the ML model may additionally or alternatively output, from a last layer, the classification itself in addition to or instead of the confidence score.

At operation 504, example process 500 may comprise determining, based at least in part on the sensor data, a first candidate action and a second candidate action, according to the techniques discussed herein. In some examples, the first candidate action may be an action that has already been determined to be carried out, e.g., at a previous step in the tree, or one that the vehicle is currently carrying out. In some examples, the second candidate action may be based at least in part on a previous prediction node, such as in an example where the previous state is known and the candidate action is generated to determine a next prediction node. In another example, the second candidate action may be based at least in part on a next prediction node, such that the second candidate action is generated to reach that next prediction node. Either example may be used, depending on the configuration of the tree search. The second candidate action determined at operation 504 may be determined based at least in part on a prediction node of a most recently determined layer of prediction nodes, whether that is previous prediction nodes that were reached by previously selected candidate actions or next prediction nodes that are to be reached by the candidate actions generated at operation 504.

Determining the second candidate action may include receiving a canonical candidate action from memory and/or providing to the planning component environment state data associated with a prediction node upon which the candidate action is based and receiving the candidate action from the planning component. In an additional or alternate example, determining the second candidate action may be based at least in part on environment state data. The environment state data may be current environment state data (if the prediction node is the root node) or predicted environment state data associated, as discussed above. Additionally or alternatively, the second candidate action may be determined based at least in part on a lane reference type, a target type, an expansion variable, an offset, a multiplier, and/or a propensity type.

The lane reference type may be an indication of whether a lane reference for generating the candidate action should be generated using sensor data or using a predefined lane reference, such as may be indicated in a pre-generated map. A lane reference may or may not be associated with a center of the lane (e.g., the lane reference may be a center of the lane for a straight lane portion, but on curves the lane reference may be biased toward the inside or outside of the curve).

The target type may define an action type for accomplishing the current route or mission. For example, the target type may specify a current lane of the vehicle, an adjacent lane, a parking space, a position in free space (e.g., where no lane markings exist), or the like.

The expansion variable may identify a weight, distance, factor, and/or other bounds on how far laterally (and/or longitudinally in some examples) unoccupied space can be explored (e.g., how far laterally candidate actions can take the vehicle). For example, the expansion variable may be a general constraint for how different the candidate actions may be.

The offset may identify a predetermined distance from the lane reference by which to iterate exploration of candidate actions. The distance may additionally or alternatively be determined dynamically based at least in part on sensor data, such as a speed of the vehicle, a complexity of the environment (see U.S. patent application Ser. No. 17/184,559, filed Feb. 24, 2021, the entirety of which is incorporated by reference herein for all purposes), or the like.

The multiplier may be a factor between 0 and 1, which may be multiplied by the current maximum speed allowed by the law to determine the maximum speed associated with the candidate action. The multiplier may be randomized, varied according to a pattern, and/or may be constrained based at least in part on bounds set by the planning component based at least in part on the environment state data and the previous trajectory of the vehicle.

The propensity type may identify curvature, velocity, and/or acceleration constraints associated with different behavior types, such as "assertive," which may be associated with higher curvature, velocity, and/or acceleration and which may be required when the perception component detects a complex environment or other assertive traffic; "nominal" which may provide a baseline for typical interactions with other agents; "conservative;" and/or "submissive." The perception engine and/or the planning component may work together to determine the propensity type to be used, as discussed in more detail in U.S. Pat. No. 11,541,909, filed Aug. 28, 2020, the entirety of which is incorporated by reference herein for all purposes.

Once the planning component generates a second candidate action, the tree search component may update the tree search data structure to include an action node indicating the second candidate action.

In some examples, the second candidate action may be associated with controlling the vehicle over a first time period that is subsequent to a time period associated with the first candidate action. As discussed below, a candidate action of a layer deeper than the layer associated with the first candidate action may be associated with controlling the vehicle over a time period subsequent to the first time period. In some examples, the time periods associated with each subsequent layer of action nodes may be equal or, in an additional or alternate example, the time periods may increase in length (e.g., exponentially, logarithmically). For example, the first candidate action may be associated with controlling the vehicle over a 1 second period, a second candidate action associated with an action node one layer deeper than the first layer may control the vehicle over 1.1 seconds, a third layer may control the vehicle over a period of 1.25 seconds, and so on. This increasing time period may ensure that a greater precision and/or accuracy is obtained for imminent actions, while also ensuring that the more distant actions won't control the vehicle in a manner that results in higher costs/negative outcomes.

In a first example, the first candidate action may be a same maneuver as the second candidate action, only displaced further in time and space. In a second example, the first candidate action may be different from the second candidate action.

At operation 506, example process 500 may comprise determining, by a cost function of the tree search and based at least in part on a controller profile, a cost associated with a trajectory for transitioning between the first candidate action and the second candidate action, according to the techniques discussed herein. Operation 506 may be repeated for different controller profiles up to n different controller profiles, where n is a positive integer. For example, operation 506(1) may comprise determining a first cost associated with controlling the vehicle using a first controller profile to transition between the first candidate action, resulting in a first trajectory; and the second candidate action and operation 506(n) may comprise determining a second cost associated with controlling the vehicle using an n-th controller profile to transition between the first candidate action and the second candidate action, resulting in an n-th trajectory.

As discussed above, determining the cost for the trajectory that would result in using a particular controller profile to affect the transition may comprise determining a cost associated with the trajectory based at least in part on a number of factors and/or cost function(s). For example, a safety cost function may determine a first sub-cost that takes into account conformance of the candidate action to rules of the road, a minimum distance between an object and the vehicle that would result from controlling the vehicle according to the trajectory, and/or the like. A weight may be assigned to these different factors and their respective values to determine the safety sub-cost. The safety sub-cost may be summed with other sub-costs to determine the cost associated with a respective trajectory. For example, the other sub-costs may include sub-costs determined by cost function (s) associated with deviation of a trajectory from a route, progress made along a route, passenger comfort, objective completion, driving performance, and/or the like. The factors that these different sub-costs may be based on may include factors such as how close the trajectory would cause the autonomous vehicle to pass static object(s) and/or dynamic object(s); a proximity of the autonomous vehicle to non-drivable surface(s); a velocity, acceleration, and/or jerk associated with the trajectory; a short-term goal cost (e.g., displacement/progress along a route, parking, achieving a soft objective indicated by a teleoperations device—i.e., an objective that the autonomous vehicle is not required to meet but is factored into the cost determination to increase a likelihood of the autonomous vehicle operating in a particular manner); conformance of the trajectory to rules of the road and/or other legal implications of implementing the trajectory; a likelihood of impact with an object; an acceleration required to avoid impact; a time until impact; a predicted likelihood of impact; driving dynamics (e.g., the feasibility of a maneuver, the likelihood of weather or other environmental conditions to impinge on execution of the trajectory), and/or the like.

In some examples, operation 506 may include a hierarchical cost determination for a candidate action, that conserves the amount of regression in higher priority objectives permissible for determining a candidate action that will control the vehicle. This hierarchical tree search may break the cost determination into different hierarchical levels in order of priority. For example, a first level of the hierarchical cost determination may be associated with object impact and/or safety of the vehicle, a second level may be associated with vehicle progress and/or passenger comfort, a third level may be associated with driving dynamics, and so on. Each level may be associated with one or more objectives and a particular objective may have one or more cost functions associated therewith. For example, a safety objective may be associated with multiple different sub-costs that may be based at least in part on the proximity to an object that a candidate action would bring the vehicle, minimum braking distance or maximum braking force to a nearest object, conformance to rules of the road, and/or the like. A passenger comfort objective may be associated with determining an acceleration or jerk associated with the candidate action and/or one or more lateral and/or longitudinal velocity, acceleration, and/or jerk thresholds.

The hierarchical cost determination may include determining a cost for a candidate action, which may be associated with a corresponding action node in the tree search, and/or a prediction node associated with that action node. The techniques may include determining first costs for multiple action nodes and their corresponding prediction nodes for a first level of the hierarchy using a first cost function (or multiple cost functions in examples where the first level is associated with multiple objectives). The cost may be based at least in part on the candidate action itself and/or the state indicated by the prediction node. In some examples, for the first level, the techniques may determine the lowest (first level) cost candidate action from among the multiple first level costs and action nodes or a candidate action that is associated with a first level cost that is below a threshold first cost. The techniques may include masking out (making unavailable for selection) any action nodes and/or prediction nodes that are associated with first level cost(s) that exceed the first level cost of the lowest first level cost candidate action by more than a threshold difference from the first level cost associated with the candidate action selected for the first level.

For the second level, for the subset of candidate actions associated with first level costs that are within the threshold difference from the first level cost associated with the candidate action selected at the first level, the hierarchical cost determination may include determining second level costs associated with the subset of action nodes and/or prediction nodes by second cost function(s) associated with the second objective(s) of the second level. The techniques may determine a candidate action, from among the unmasked candidate actions, that is associated with a lowest second level cost from among the multiple second level costs. In examples where candidate actions haven't previously been masked or to verify the validity of the candidate action, the techniques may determine a difference between a first level cost of the candidate action determined at the second level and a first level cost of the candidate action determined at the first level. If this difference is less than the threshold difference, the candidate action determined at the second level may be used or passed to a next level of the hierarchical tree search. In some examples, a second threshold difference that may be the same or different than the first level threshold difference may be associated with the second level and any candidate actions associated with second level costs that exceed the threshold difference plus the cost of the candidate action determined at the second level may be masked out. This process may be repeated until a final level is reached, ensuring that the ultimate candidate action chosen at operation 508 does not regress costs determined at previous levels. Functionally, the hierarchical cost determination allows for small concessions in higher level objective costs to achieve potentially large cost-savings in lower level objectives while ensuring that the higher level objectives aren't compromised.

For example, a first candidate action might be associated with a lowest first level cost, which may indicate that the first candidate action is estimated to be the safest candidate action. However, candidate actions having costs within the first level's threshold difference from the first candidate action would also be considered safe. At a second level that may be associated with progress along a route, a second candidate action may make far more progress along the route than the first candidate action and therefore have a lower second level cost than the first candidate action's second level cost. So long as the second candidate action's first level cost is not greater than the first candidate action's first level cost by more than the first level's threshold difference (indicating that the second candidate action is also safe), the second candidate action may be selected for the second level. This may be repeated until a final level is reached and the last candidate action selected for the last level (that hasn't been masked out, i.e., doesn't violate any of the threshold differences of the former levels) may be selected for implementation at operation 508.

Any one or more of the cost functions of any of the levels may be based at least in part on a controller profile. For example, a safety objective cost function may be based on how close the vehicle would get to an object when different controller profiles are used. Accordingly, a different level cost may be determined for up to each combination of different controller profile with a candidate action.

In some examples, a property of a controller profile may be dynamically determined based at least in part on scenario data determined based at least in part on sensor data. For example, the scenario data may include a velocity of the vehicle, a velocity of a candidate action, roadway geometry, a number or type of objects in the environment, an erratic behavior indication associated with an object, environmental condition (e.g., weather state, emergency existence, environment type (e.g., highway, residential, urban), and/or a lateral displacement of a candidate action from a current position of the vehicle or a last candidate action implemented by the vehicle, etc. For example, the acceleration and/or jerk limit may be increased or decreased based at least in part on any of these characteristics. In some examples, the scenario data may additionally or alternatively be used to alter a cost function. For example, in foggy weather conditions, a sub-cost determined by a cost function associated with vehicle progress along a route may be down-weighted in foggy weather or upscaled when an emergency condition has been detected, such as an earthquake, etc. In the latter example, a comfort cost function may be far down-weighted. Or in another example, detection of an environment type, such as operating on a highway, in an urban area, or in a residential area may cause a re-weighting of one or more of the cost functions.

In some examples, operation 506 may result in determining a first cost associated with implementing the transition using a first controller profile and determining a second cost associated with implementing the transition using a second controller profile.

At operation 508, example process 500 may comprise determining that the first cost is lower than the second cost, according to the techniques discussed herein. For example, operation 508 may determine a candidate action-controller profile pair that is associated with a cost that is a minimum cost among all the candidate action-controller profile pairs explored by the tree search or a cost that is below a cost threshold. This first cost may be associated with a first controller profile.

At operation 510, example process 500 may comprise controlling the vehicle by tracking the first tractor using the first controller profile, according to the techniques discussed herein. The controller(s) may track to the second candidate action from the first candidate action by determining controls suitable to actuate the drive components to cause the vehicle to reach a state indicated by the second candidate action, subject to the controller properties defined by the first controller profile. This may include applying a gain to the controls and additionally or alternatively constraining an acceleration and/or jerk of the movement caused by the controls as defined by an acceleration limit and/or jerk limit of the controller profile.

EXAMPLE CLAUSES

A. A system comprising: one or more processors; and non-transitory memory storing processor-executable instructions that, when executed by the one or more processors, cause the system to perform operations comprising: receiving sensor data; determining, based at least in part on the sensor data, a first candidate action and a second candidate action; determining, by a cost function, a first cost associated with a first trajectory for transitioning between the first candidate action and the second candidate action, wherein the first trajectory is based at least in part on using a first controller profile to transition between the first candidate action and the second candidate action; determining, by the cost function, a second cost associated with a second trajectory for transitioning between the first candidate action and the second candidate action, wherein the second trajectory is based at least in part on a second controller profile to transition between the first candidate action and the second candidate action; determining that the first cost is lower than the second cost; and controlling a vehicle based at least in part on the first trajectory.

B. The system of paragraph A, wherein: the first controller profile specifies at least one of a first acceleration limit or a first jerk limit associated with the first trajectory; and the second controller profile specifies at least one of a second acceleration limit or a second jerk limit associated with the second trajectory, wherein at least one of the second acceleration limit or the second jerk limit is different than at least one of the first acceleration limit or the first jerk limit.

C. The system of either paragraph A or B, wherein: the cost function is part of a tree search; and the first cost is based at least in part on at least one of at least one of a jerk or acceleration that would result from controlling the vehicle using the first trajectory.

D. The system of paragraph C wherein the first cost is further based at least in part a determination of at least one of safety, legality, progress along a route, or a predicted state associated with performing the first trajectory to transition between the first candidate action and the second candidate action.

E. The system of any one of paragraphs A-D, wherein: the first controller profile specifies at least one of a first acceleration limit and a first jerk limit associated with the first trajectory; and the operations further comprise determining at least one of the first acceleration limit or the first jerk limit based at least in part on a velocity associated with at least one of the vehicle, the first candidate action, or the second candidate action; a roadway geometry; or a lateral displacement associated with at least one of the first candidate action or the second candidate action.

F. A method comprising: receiving sensor data from a sensor; determining, based at least in part on the sensor data, a first candidate action and a second candidate action for controlling motion of a vehicle; determining, by a cost function, a first cost associated with using a first controller profile to transition between the first candidate action and the second candidate action, resulting in a first trajectory, wherein the first controller profile is one controller profile from among multiple controller profiles specifying different at least one of acceleration limits or jerk limits; and controlling the vehicle by tracking the first trajectory using the first controller profile.

G. The method of paragraph F, wherein: the first controller profile specifies at least one of a first acceleration limit or a first jerk limit associated with the first trajectory for transitioning between the first candidate action and the second candidate action; and a second controller profile of the multiple controller profiles specifies at least one of a second acceleration limit or a second jerk limit associated with a second trajectory for transitioning between the first candidate action and the second candidate action.

H. The method of paragraph G, wherein the method further comprises: determining, by the cost function, a second cost associated with the second trajectory that results from using the second controller profile to transition between the first candidate action and the second candidate action; determining, based at least in part on the first cost and the second cost, to use the first controller profile.

I. The method of paragraph H, wherein the first cost comprises a first sub-cost associated with a first objective level and a second sub-cost associated with a second objective level; the second cost comprises a third sub-cost associated with the first objective level and a fourth sub-cost associated with the second objective level; and the method further comprises determining to use the first trajectory based at least in part on determining that: the second sub-cost is less than the fourth sub-cost; and the first sub-cost is greater than the third sub-cost by an amount that is less than a threshold amount associated with the first objective level.

J. The method of any one of paragraphs F-I, wherein: the cost function is part of a tree search; and the first cost is based at least in part on at least one of a jerk or acceleration that would result from controlling the vehicle using the first trajectory.

K. The method of paragraph J, wherein the first cost is further based at least in part a determination of at least one of safety, legality, progress along a route, comfort, driving feasibility, or a predicted state associated with performing the trajectory to transition between the first candidate action and the second candidate action.

L. The method of any one of paragraphs F-K, wherein: the first controller profile specifies at least one of a first acceleration limit or a first jerk limit confining the trajectory; and the method further comprises: determining, based at least in part on the sensor data, scenario data indicating a characteristic of at least one of an environment, an object in the environment, or the vehicle; and determining at least one of the first acceleration limit or the first jerk limit based at least in part on the scenario data.

M. The method of any one of paragraphs F-L, wherein the method further comprises: determining, based at least in part on the sensor data, scenario data indicating a characteristic of at least one of an environment, an object in the environment, or the vehicle; and altering the cost function or a sub-cost function of the cost function based at least in part on the scenario data.

N. One or more non-transitory computer-readable media storing processor-executable instructions that, when executed by one or more processors, cause the one or more processors to perform operations comprising: receiving sensor data from a sensor; determining, based at least in part on the sensor data, a first candidate action and a second candidate action for controlling motion of a vehicle; determining, by a cost function, a first cost associated with using a first controller profile to transition between the first candidate action and the second candidate action, resulting in a first trajectory, wherein the first controller profile is one controller profile from among multiple controller profiles specifying different at least one of acceleration limits or jerk limits; and controlling the vehicle by tracking the first trajectory using the first controller profile.

O. The one or more non-transitory computer-readable media of paragraph N, wherein: the first controller profile specifies at least one of a first acceleration limit or a first jerk limit associated with the first trajectory for transitioning between the first candidate action and the second candidate action; and a second controller profile of the multiple controller profiles specifies at least one of a second acceleration limit or a second jerk limit associated with a second trajectory for transitioning between the first candidate action and the second candidate action.

P. The one or more non-transitory computer-readable media of paragraph O, wherein the operations further comprise: determining, by the cost function, a second cost associated with the second trajectory that results from using the second controller profile to transition between the first candidate action and the second candidate action; determining, based at least in part on the first cost and the second cost, to use the first controller profile.

Q. The one or more non-transitory computer-readable media of paragraph P, wherein the first cost comprises a first sub-cost associated with a first objective level and a second sub-cost associated with a second objective level; the second cost comprises a third sub-cost associated with the first objective level and a fourth sub-cost associated with the second objective level; and the operations further comprise determining to use the first trajectory based at least in part on determining that: the second sub-cost is less than the fourth sub-cost; and the first sub-cost is greater than the third sub-cost by an amount that is less than a threshold amount associated with the first objective level.

R. The one or more non-transitory computer-readable media of any one of paragraphs N-Q, wherein: the cost function is part of a tree search; and the first cost is based at least in part on at least one of a jerk or acceleration that would result from controlling the vehicle using the first trajectory.

S. The one or more non-transitory computer-readable media of any one of paragraphs N-R, wherein: the first controller profile specifies at least one of a first acceleration limit or a first jerk limit confining the trajectory; and the operations further comprise: determining, based at least in part on the sensor data, scenario data indicating a characteristic of at least one of an environment, an object in the environment, or the vehicle; and determining at least one of the first acceleration limit or the first jerk limit based at least in part on the scenario data.

T. The one or more non-transitory computer-readable media of any one of paragraphs N-S, wherein the operations further comprise: determining, based at least in part on the sensor data, scenario data indicating a characteristic of at least one of an environment, an object in the environment, or the vehicle; and altering the cost function or a sub-cost function of the cost function based at least in part on the scenario data.

U. The system of any one of paragraphs A-E, wherein the operations further comprise: determining, based at least in part on the sensor data, scenario data indicating a characteristic of at least one of an environment, an object in the environment, or the vehicle; and altering at least one of the first controller profile or the second controller profile based at least in part on the scenario data.

V. The system of paragraph A, wherein the operations further comprise: determining, based at least in part on the sensor data, scenario data indicating a characteristic of at least one of an environment, an object in the environment, or the vehicle; and altering the cost function or a sub-cost function of the cost function based at least in part on the scenario data.

W. An autonomous vehicle comprising the one or more non-transitory computer-readable media of any one of paragraphs N-T or the system of any one of paragraphs A-E, U, or V.

X. A system comprising one or more processors and non-transitory memory storing processor-executable instructions that, when executed by the one or more processors, perform the method of any one of paragraphs F-M.

While the example clauses described above are described with respect to one particular implementation, it should be understood that, in the context of this document, the content of the example clauses can also be implemented via a method, device, system, computer-readable medium, and/or another implementation. Additionally, any of examples A-X may be implemented alone or in combination with any other one or more of the examples A-X.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
  one or more processors; and
  non-transitory memory storing processor-executable instructions that, when executed by the one or more processors, cause the system to perform operations comprising:
    receiving sensor data;
    determining, based at least in part on the sensor data, a first candidate action and a second candidate action, wherein the first candidate action indicates a first maneuver and the second candidate action indicates a second maneuver;
    determining, by a cost function, a first cost associated with a first trajectory for transitioning between the first candidate action and the second candidate action, wherein the first trajectory is based at least in part on using a first controller profile to transition between the first candidate action and the second candidate action, and the first trajectory is distinct from the first maneuver;

determining, by the cost function, a second cost associated with a second trajectory for transitioning between the first candidate action and the second candidate action, wherein the second trajectory is based at least in part on a second controller profile to transition between the first candidate action and the second candidate action, and the second trajectory is distinct from the second maneuver;

determining that the first cost is lower than the second cost; and controlling a vehicle based at least in part on the first trajectory.

2. The system of claim 1, wherein:

the first controller profile specifies at least one of a first acceleration limit or a first jerk limit associated with the first trajectory; and the second controller profile specifies at least one of a second acceleration limit or a second jerk limit associated with the second trajectory, wherein at least one of the second acceleration limit or the second jerk limit is different than at least one of the first acceleration limit or the first jerk limit.

3. The system of claim 1, wherein:

the cost function is part of a tree search; and the first cost is based at least in part on at least one of at least one of a jerk or acceleration that would result from controlling the vehicle using the first trajectory.

4. The system of claim 1, wherein:

the first controller profile specifies at least one of a first acceleration limit and a first jerk limit associated with the first trajectory; and the operations further comprise determining at least one of the first acceleration limit or the first jerk limit based at least in part on a velocity associated with at least one of the vehicle, the first candidate action, or the second candidate action; a roadway geometry; or a lateral displacement associated with at least one of the first candidate action or the second candidate action.

5. The system of claim 1, wherein:

determining the first candidate action and the second candidate action is determined at a first time;

transitioning between the first candidate action and the second candidate action is associated with a second time distinct from the first time; and the operations further comprise determining a third trajectory for transitioning between the second candidate action and at least one of the first candidate action and a third candidate action determined at the first time, the third trajectory being associated with a third time different from the first time and the second time.

6. The system of claim 1, wherein the first controller profile is different from the second controller profile based at least in part on at least one of:

the first controller profile being associated with different perception data than the second controller profile;

the first controller profile being associated with a different safety cost than the second controller profile; or the first controller profile being associated with a different comfort cost than the second controller profile.

7. A method comprising:

receiving sensor data from a sensor;

determining, based at least in part on the sensor data, a first candidate action and a second candidate action for controlling motion of a vehicle, wherein the first candidate action indicates a first maneuver and the second candidate action indicates a second maneuver;

determining, by a cost function, a first cost associated with using a first controller profile to transition between the first candidate action and the second candidate action, resulting in a first trajectory, wherein the first controller profile is one controller profile from among multiple controller profiles specifying different at least one of acceleration limits or jerk limits and the first trajectory is distinct from the first maneuver; and controlling the vehicle by tracking the first trajectory using the first controller profile.

8. The method of claim 7, wherein:

the first controller profile specifies at least one of a first acceleration limit or a first jerk limit associated with the first trajectory for transitioning between the first candidate action and the second candidate action; and a second controller profile of the multiple controller profiles specifies at least one of a second acceleration limit or a second jerk limit associated with a second trajectory for transitioning between the first candidate action and the second candidate action.

9. The method of claim 8, wherein the method further comprises:

determining, by the cost function, a second cost associated with the second trajectory that results from using the second controller profile to transition between the first candidate action and the second candidate action; and determining, based at least in part on the first cost and the second cost, to use the first controller profile.

10. The method of claim 9, wherein:

the first cost comprises a first sub-cost associated with a first objective level and a second sub-cost associated with a second objective level;

the second cost comprises a third sub-cost associated with the first objective level and a fourth sub-cost associated with the second objective level; and the method further comprises determining to use the first trajectory based at least in part on determining that:

the second sub-cost is less than the fourth sub-cost; and the first sub-cost is greater than the third sub-cost by an amount that is less than a threshold amount associated with the first objective level.

11. The method of claim 7, wherein:

the cost function is part of a tree search; and the first cost is based at least in part on at least one of a jerk or acceleration that would result from controlling the vehicle using the first trajectory.

12. The method of claim 11, wherein the first cost is further based at least in part a determination of at least one of safety, legality, progress along a route, comfort, driving feasibility, or a predicted state associated with performing the first trajectory to transition between the first candidate action and the second candidate action.

13. The method of claim 7, wherein:

the first controller profile specifies at least one of a first acceleration limit or a first jerk limit confining the first trajectory; and the method further comprises:

determining, based at least in part on the sensor data, scenario data indicating a characteristic of at least one of an environment, an object in the environment, or the vehicle; and determining at least one of the first acceleration limit or the first jerk limit based at least in part on the scenario data.

14. The method of claim 7, wherein the method further comprises:

determining, based at least in part on the sensor data, scenario data indicating a characteristic of at least one of an environment, an object in the environment, or the vehicle; and altering the cost function or a sub-cost function of the cost function based at least in part on the scenario data.

15. One or more non-transitory computer-readable media storing processor-executable instructions that, when executed by one or more processors, cause the one or more processors to perform operations comprising:

receiving sensor data from a sensor;

determining, based at least in part on the sensor data, a first candidate action and a second candidate action for controlling motion of a vehicle, wherein the first candidate action indicates a first maneuver and the second candidate action indicates a second maneuver;

determining, by a cost function, a first cost associated with using a first controller profile to transition between the first candidate action and the second candidate action, resulting in a first trajectory, wherein the first controller profile is one controller profile from among multiple controller profiles specifying different at least one of acceleration limits or jerk limits and the first trajectory is distinct from the first maneuver; and controlling the vehicle by tracking the first trajectory using the first controller profile.

16. The one or more non-transitory computer-readable media of claim 15, wherein:

the first controller profile specifies at least one of a first acceleration limit or a first jerk limit associated with the first trajectory for transitioning between the first candidate action and the second candidate action; and a second controller profile of the multiple controller profiles specifies at least one of a second acceleration limit or a second jerk limit associated with a second trajectory for transitioning between the first candidate action and the second candidate action.

17. The one or more non-transitory computer-readable media of claim 16, wherein the operations further comprise:

determining, by the cost function, a second cost associated with the second trajectory that results from using the second controller profile to transition between the first candidate action and the second candidate action; and determining, based at least in part on the first cost and the second cost, to use the first controller profile.

18. The one or more non-transitory computer-readable media of claim 17, wherein:

the first cost comprises a first sub-cost associated with a first objective level and a second sub-cost associated with a second objective level;

the second cost comprises a third sub-cost associated with the first objective level and a fourth sub-cost associated with the second objective level; and the operations further comprise determining to use the first trajectory based at least in part on determining that:
the second sub-cost is less than the fourth sub-cost; and
the first sub-cost is greater than the third sub-cost by an amount that is less than a threshold amount associated with the first objective level.

19. The one or more non-transitory computer-readable media of claim 15, wherein:

the cost function is part of a tree search; and the first cost is based at least in part on at least one of a jerk or acceleration that would result from controlling the vehicle using the first trajectory.

20. The one or more non-transitory computer-readable media of claim 15, wherein:

the first controller profile specifies at least one of a first acceleration limit or a first jerk limit confining the first trajectory; and the operations further comprise:

determining, based at least in part on the sensor data, scenario data indicating a characteristic of at least one of an environment, an object in the environment, or the vehicle; and determining at least one of the first acceleration limit or the first jerk limit based at least in part on the scenario data.

* * * * *